United States Patent [19]

Shinohara et al.

[11] Patent Number: 5,409,270
[45] Date of Patent: Apr. 25, 1995

[54] GASKET RETAINER FOR USE IN PIPE JOINTS

[75] Inventors: Tsutomu Shinohara; Kazuhiro Yoshikawa, both of Osaka, Japan

[73] Assignee: Fujikin Incorporated, Osaka, Japan

[21] Appl. No.: 115,822

[22] Filed: Sep. 3, 1993

Related U.S. Application Data

[63] Continuation of Ser. No. 882,863, May 14, 1992, abandoned.

[30] Foreign Application Priority Data

May 20, 1991 [JP] Japan ................ 3-35551 U

[51] Int. Cl.⁶ .............................................. F16L 19/00
[52] U.S. Cl. .................................. 285/379; 285/328; 277/189
[58] Field of Search ............... 285/328, 379; 277/11, 277/95, 236, 189

[56] References Cited

U.S. PATENT DOCUMENTS

| | | | |
|---|---|---|---|
| 917,388 | 4/1909 | Welch | 285/379 X |
| 1,339,141 | 5/1990 | Sharpnack | 285/379 X |
| 1,354,904 | 10/1920 | Glass | 285/379 X |
| 2,462,762 | 2/1949 | Nardin | 277/11 |
| 4,650,227 | 3/1987 | Babuder et al. | 285/379 |
| 4,838,583 | 6/1989 | Babuder | 285/379 |
| 5,050,914 | 4/1991 | Miyashita | 285/379 |
| 5,145,219 | 9/1992 | Babuder | 285/379 |
| 5,163,721 | 11/1992 | Babuder | 285/328 |

*Primary Examiner*—Eric K. Nicholson
*Attorney, Agent, or Firm*—Armstrong, Westerman, Hattori, McLeland & Naughton

[57] ABSTRACT

A retainer for use in a pipe joint having a pair of tubular joint members for holding an annular gasket in position between opposed end faces of the joint members. The retainer comprises an end wall portion positionable on one side face of the gasket, a cylindrical portion extending from the end wall portion substantially perpendicular thereto for preventing the gasket from moving radially thereof, and an engaging portion provided on the cylindrical portion and engageable with an end portion of one of the joint members. The end wall portion has a cutout for passing the gasket therethrough.

2 Claims, 2 Drawing Sheets

GASKET RETAINER FOR USE IN PIPE JOINTS

This application is a continuation of application Ser. No. 07/882,863, filed May 14, 1992, abandoned.

BACKGROUND OF THE INVENTION

The present invention relates to a retainer for use in pipe joints, and more particularly to a retainer for holding an annular gasket in position between opposed end faces of a pair of tubular joint members.

DESCRIPTION OF THE PRIOR ART

Retainers are already known for holding an annular gasket in position between opposed end faces of a pair of tubular joint members. The known retainer comprises an annular end wall, a cylindrical side wall extending outward from the end wall substantially perpendicular thereto, and a plurality of holding legs extending further outward from the cylindrical side wall and having means engageable with the joint member (see Examined Japanese Patent Publication HEI 2-62756).

The gasket for use in pipe joints needs to be replaced, for example, when becoming impaired in sealing effect. However, the conventional retainer is so shaped as to surround the entire gasket with the annular end wall and the cylindrical side wall, with the result that the gasket can not be placed into or removed from the retainer as attached to the end portion of the joint member. Accordingly, the replacement of the gasket requires the cumbersome procedure of removing the retainer from the joint member. Furthermore, after pipes have been joined to the joint for piping, it is likely that only a small clearance will be formed between the opposed ends of the two joint members even when the joint members are unfastened from each other. It is then impossible to change the gasket as installed in this state, so that there arises a need to cut the piping for changing the gasket and thereafter weld the piping, or to replace the entire piping assembly including the joint and the pipes on opposite sides by a new one. Nevertheless, the replacement of the entire piping assembly is very cumbersome, takes much time and is uneconomical.

To overcome the above problem, we have proposed a retainer which comprises an annular body positionable on one side face of a gasket and having a pair of support lugs projecting from the outer periphery of the annular body at positions dividing the circumference thereof into two equal portions. The support lugs are opposed to each other for holding an end portion of a joint member therebetween, and a gasket support is provided on only one of the divided peripheral portion of the body (see Examined Japanese Patent Publication HEI 1-28398).

The proposed retainer is so adapted that the gasket can be replaced with the retainer attached to the end portion of the joint member, whereas the retainer has the problem that the gasket is liable to slip off the retainer and difficult to handle when the retainer is stored or transported with the gasket fitted therein since the gasket is merely held by the gasket support which is provided on a part of the lower half of the retainer body outer periphery.

SUMMARY OF THE INVENTION

The main object of the present invention is to provide a retainer for use in pipe joints which permits easy replacement of the gasket even after pipes have been joined to the joint and which is adapted to hold the gasket as fitted therein without the likelihood of the gasket slipping off readily.

The present invention provides a retainer for use in a pipe joint having a pair of tubular joint members for holding an annular gasket in position between opposed end faces of the joint members, the retainer comprising an end wall portion to be positioned on one side face of the gasket, a cylindrical portion extending from the end wall portion substantially perpendicular thereto for preventing the gasket from moving radially thereof, and an engaging portion provided on the cylindrical portion and engageable with an end portion of one of the joint members, the end wall portion being formed with a cutout for passing the gasket therethrough.

Preferably, the cutout subtends an angle of 160 to 180 degrees at the center of the end wall portion.

The gasket can be placed into or removed from the retainer through the cutout formed in the end wall portion and can therefore be replaced with the retainer attached to the end portion of the joint member. When fitted in the retainer, the gasket is prevented by the cylindrical portion from moving radially thereof, with one side face thereof held by the retainer end wall portion, and is therefore precluded from slipping off the retainer readily.

Thus, the gasket can be replaced with the retainer of the invention attached to the joint member end portion, so that it is easy to replace the gasket even after pipes have been joined to the joint. When fitted in the retainer, the gasket will not readily slip off the retainer. The retainer is therefore convenient to store or transport.

DESCRIPTION OF THE PREFERRED EMBODIMENT

An embodiment of the invention will be described below with reference to the accompanying drawings. In the following description, the terms "right" and "left" refer to the right-hand side and left-hand side of FIG. 1, respectively.

Figure 1:
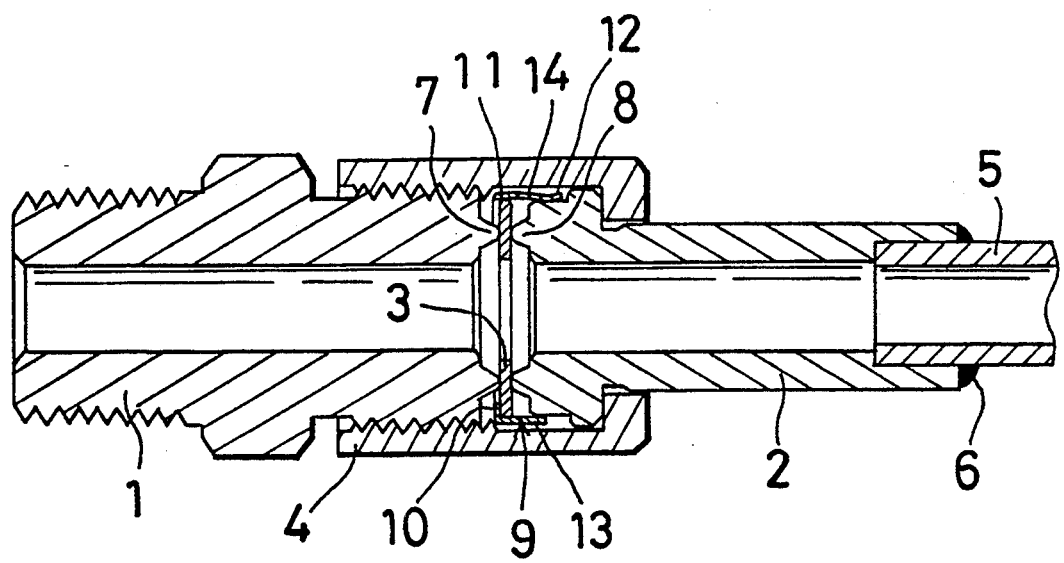
FIG. 1 is a view in longitudinal section of a pipe joint wherein a retainer embodying the invention is used.

Referring to FIG. 1, the right end face of a first tubular joint member 1 is butted against the left end face of a second tubular joint member 2, with an annular gasket 3 held therebetween and retained on the left end of the second joint member 2 by a retainer 9. The second joint member 2 is fastened to the first joint member 1 by a nut 4 fitted around the second joint member 2 and screwed on the first joint member 1. A pipe 5 is inserted into the second joint member 2 from its right end and secured to the member 2 by a weld 6. The butting end faces of the first and second joint members 1 and 2 are respectively formed with annular ridges 7, 8 semicircular in cross section for holding the gasket 3 therebetween.

Figure 2:
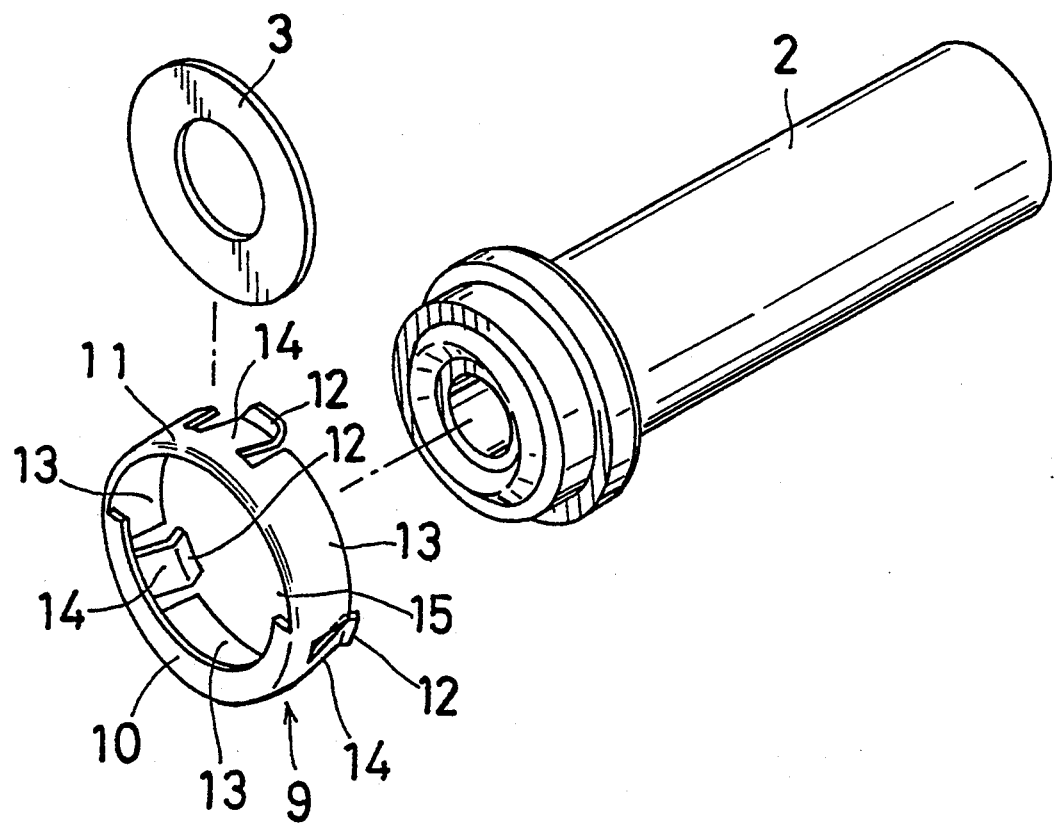
FIG. 2 is a fragmentary exploded perspective view of FIG. 1.
Figure 3:
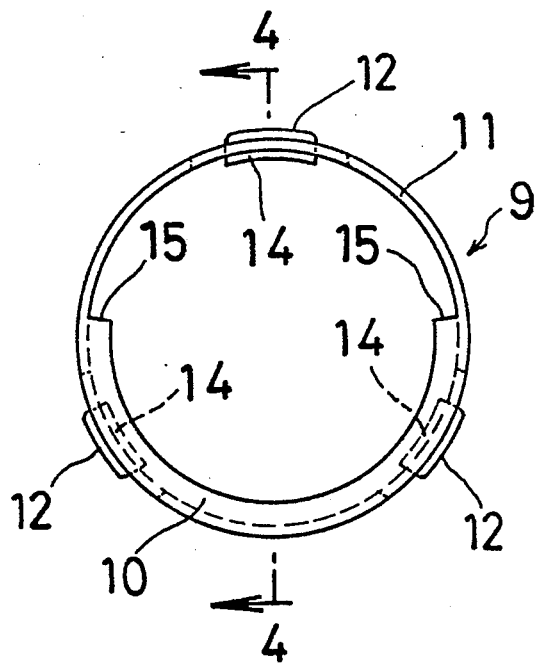
FIG. 3 is a front view of the retainer.
Figure 4:
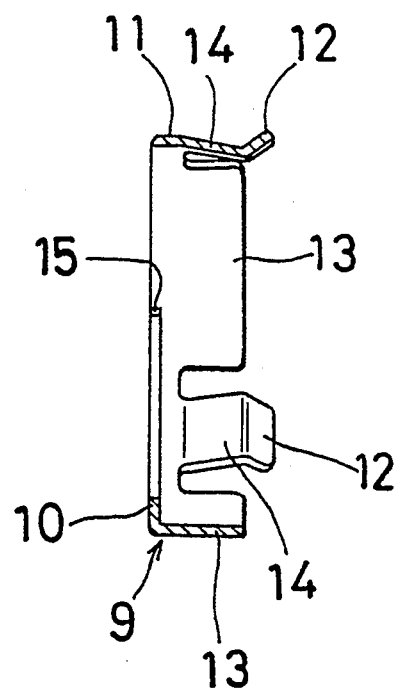
FIG. 4 is a view in section taken along the line 4—4 in FIG. 3.

With reference to FIG. 2, the retainer 9 is made of a thin metal plate and comprises an end wall portion 10 positionable on one side face of the gasket 3, a cylindrical portion 11 extending from the end wall portion 10 substantially perpendicular thereto, and an engaging portion provided on the forward end (right end) of the cylindrical portion 11 and engageable with the left end of the second joint member 2. The end wall portion 10 has a cutout 15.

The end wall portion 10 is in the form of an annular wall which is partly cut out along its circumference to form the cutout 15 subtending an angle of about 170 degrees at the center of the portion 10. The gasket 3 can be brought into and out of the retainer 9 through the cutout 15. The cutout 15 is formed only in the end wall portion 10 and not provided in the cylindrical portion 11.

Two incisions are formed in the part of the cylindrical portion 11 toward its forward end at each of positions dividing the circumference of the portion 11 into three equal portions, whereby large circular-arc portions 13 and small circular-arc portions 14 are formed as arranged alternately. The small circular-arc portions 14 are slightly bent inward and each have at its outer end a support projection 12 for holding the outer surface of the left end portion of the second joint member 2. The engaging portion comprises these three support projections 12. Since the retainer 9 is thin and made of metal, the engaging portion has elasticity.

When the engaging portion of the retainer 9 is fitted to the second joint member 2, the engaging portion is expanded outward to elastically engage the left end outer surface of the second joint member 2, whereby the gasket 3 as retained in the retainer 9 is held to the left end of the second joint member 2. When the nut 4 fitted around the second joint member 2 and screwed on the first joint member 1 is tightened up, the annular ridge 7 of the first joint member 1 and the annular ridge 8 of the second joint member 2 are pressed against the respective surfaces of the gasket 3 to provide a fluid-tight joint.

Figure 5:
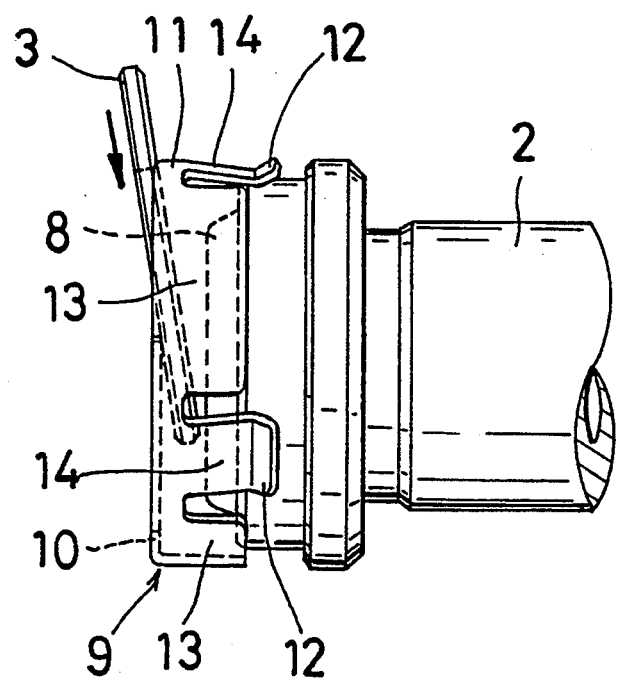
FIG. 5 is a side elevation of an assembly including the retainer to show how to remove a gasket.

The procedure for replacing the gasket 3 will be described with reference to FIG. 5.

First, the nut 4 is loosened and removed from the first joint member 1. This provides a small clearance between the opposed end faces of the two joint members 1, 2, rendering the retainer 9 slightly movable axially leftward. The retainer 9 is then moved leftward to form a clearance between the end wall portion 10 of the retainer 9 and the left end face of the second joint member 2. This state is shown in FIG. 5. The gasket 3 can be withdrawn by tilting the gasket 3 in the clearance and pulling the gasket obliquely leftward through the cutout 15 of the retainer 9. A new gasket 3 is then inserted as inclined into the retainer 9 through the cutout 15. Thus, the gasket 3 can be held in the retainer 9.

Although the engaging portion comprises three support projections 12 according to the above embodiment, the support projections are not limited to three in number. Alternatively, the engaging portion may be in the form of a ring, and the retainer may be cut axially thereof to impart elasticity to the engaging portion.

Although the end wall portion 10 is in the form of an annular wall which is cut out along a portion of its circumference subtending an angle of about 170 degrees at the center of the end wall portion, the cutout is not limited to this size provided that the gasket 3 can be passed through the cutout 15 when the two joint members 1, 2 are unfastened from each other and that the gasket 3 as fitted in the retainer 9 will not readily slip off. The center angle to be subtended by the cutout is determined in view of the outside diameter, thickness and material of the gasket and is preferably 160 to 180 degrees.

What is claimed is:

1. A retainer for use in a pipe joint having a pair of tubular joint members for holding an annular gasket in position between opposed end faces of the joint members, the retainer comprising an end wall portion positionable on one side face of the gasket, a cylindrical portion extending from the end wall portion substantially perpendicular thereto for preventing the gasket from moving radially thereof, and an engaging portion provided on the cylindrical portion and engageable with an end portion of one of the joint members, the engaging portion comprising at least three support projections projected from the cylindrical portion to the other side face of the gasket for holding an outer surface of the end portion of one of the joint members, an opening being provided in the end wall portion such that an internal diameter of the end wall portion is smaller than an outer diameter of the gasket, the end wall portion being formed with a cutout for passing the gasket therethrough, a diameter defining the cutout formed in the end wall being larger than the internal diameter of the end wall portion.

2. A retainer as defined in claim 1 wherein the cutout subtends an angle of 160 to 180 degrees at the center of the end wall portion.

* * * * *